United States Patent
Deinzer

(10) Patent No.: US 8,004,524 B2
(45) Date of Patent: Aug. 23, 2011

(54) METHOD FOR DISPLAYING 3D STRUCTURES IN 2D PROJECTION IMAGES

(75) Inventor: Frank Deinzer, Röthenbach (DE)

(73) Assignee: Siemens Aktiengesellschaft, Munich (DE)

( * ) Notice: Subject to any disclaimer, the term of this patent is extended or adjusted under 35 U.S.C. 154(b) by 905 days.

(21) Appl. No.: 11/879,949

(22) Filed: Jul. 19, 2007

(65) Prior Publication Data
US 2008/0024496 A1 Jan. 31, 2008

(30) Foreign Application Priority Data
Jul. 25, 2006 (DE) .................. 10 2006 034 387

(51) Int. Cl.
*G06T 15/10* (2011.01)
(52) U.S. Cl. ........ 345/427; 345/419; 345/420; 345/424; 382/128; 382/131; 600/407
(58) Field of Classification Search .......... 345/419, 345/426, 427, 420, 424; 355/43, 45; 382/128, 382/131
See application file for complete search history.

(56) References Cited

U.S. PATENT DOCUMENTS

| | | | | |
|---|---|---|---|---|
| 5,734,384 A * | 3/1998 | Yanof et al. | ............ | 345/424 |
| 6,345,112 B1 * | 2/2002 | Summers et al. | ............ | 382/128 |
| 6,369,812 B1 | 4/2002 | Iyriboz et al. | | |
| 6,556,696 B1 * | 4/2003 | Summers et al. | ............ | 382/128 |
| 6,928,314 B1 * | 8/2005 | Johnson et al. | ............ | 600/407 |
| 7,742,629 B2 * | 6/2010 | Zarkh et al. | ............ | 382/128 |
| 2003/0052879 A1 * | 3/2003 | Barth et al. | ............ | 345/424 |
| 2003/0156747 A1 | 8/2003 | Faber | | |
| 2007/0201737 A1 * | 8/2007 | Cai | ............ | 382/131 |

FOREIGN PATENT DOCUMENTS
DE 100 37 735 A1 2/2002

OTHER PUBLICATIONS

Ulf Labsik, Kai Hormann, Martin Meister, Günther Greiner; "Hierarchical Iso-Surface Extraction"; Journal of Computing and Information Science in Engineering, Dec. 2002, pp. 223-329; vol. 2, Issue 4.
William E. Lorensen and Harvey E. Cline; "Marching Cubes: A high Resolution 3D Surface Construction Algorithm"; Computer Graphics (SIGGRAPH '87 Proceedings), 1987; pp. 1-25.
Brochure—Leonardo—Intelligent Postprocessing / Intelligent Investment / Reliable Planning / Efficient Usage; Siemens Medical Solutions; 2004; pp. 1-81; Order No. A91100-M2040-B142-1-7600; Erlangen, Germany.
Brochure—"AXIOM Artis dBA—The Soloist's Duet for Neuroradiology and Universal Angiography"; Siemens Medical Solutions; 2004; pp. 1-20; Order No. A91100-M1400-C824;1-1-7600; Erlangen, Germany.

* cited by examiner

*Primary Examiner* — Kimbinh T Nguyen

(57) ABSTRACT

The invention relates to a method for displaying 3D structures in 2D projection images, with which the 3D structures are present as individual volumetric gray scale values, such as are supplied in particular as a result of volumetric scans with a number of sectional planes of medical tomographs, with which changes to the direction of the surface standards of the 3D structures in respect of the observation direction of the 2D projection images are characterized by the changes in the properties of the illustrated 3D structures. Methods of this type are used to display so-called vascular trees or vascular structures from a 3D data record for instance.

16 Claims, 7 Drawing Sheets

| | | |
|---|---|---|
| 90° | Blau | |
| 60° | Türkis | |
| 30° | Grün | |
| 0° | Gelb | |
| -30° | Rot | |
| -60° | Violett | |
| -90° | Blau | | aus der Bildebene in die Bildebene (a) Rot / Gelb
(b) Grün / Blau
(c) Grün / Gelb
(d) Rot / Violett

METHOD FOR DISPLAYING 3D STRUCTURES IN 2D PROJECTION IMAGES

CROSS REFERENCE TO RELATED APPLICATIONS

This application claims priority of German application No. 10 2006 034 387.5 filed Jul. 25, 2006, which is incorporated by reference herein in its entirety.

FIELD OF THE INVENTION

The invention relates to a method for displaying 3D structures in 2D projection images, in which the 3D structures are present as individual volumetric gray scale values, as are provided in particular as the result of volumetric scans with several section planes of medical tomographs. Methods of this type are used to display so-called vascular trees or vascular structures from a 3D data record for instance.

BACKGROUND OF THE INVENTION

An x-ray diagnostics facility for implementing a method of this type is known from DE 100 37 735 A1 and is shown in FIG. 1 for instance, which features a C-arc 2 which is mounted in a rotatable fashion on a stator 1, on the ends of which C-arc 2 are attached an x-ray emitter 3 and an x-ray image detector 4.

Floor and/or ceiling stands can also be used instead of the stator 1 illustrated. The C-arc 2 can also be replaced by a so-called electronic C-arc 2, with which an electronic coupling between the x-ray emitter 3 and x-ray image detector 4 is carried out. The moveable components 2 to 5 can also be mounted on robot arms individually or together.

The x-ray image detector 4 can be a rectangular or quadratic flat semiconductor detector, which is preferably created from amorphous silicon (aSi).

A patient support table 5 for accommodating a patient for instance to carry out an examination of his/her heart is positioned in the radiation path of the x-ray emitter 3. An image system 6 is connected to the x-ray diagnostics facility, said image system 6 receiving and processing the image signals of the x-ray image detector 4.

Operations on patients are, to an increasing degree, becoming minimally invasive by introducing a catheter or another medical instrument using x-ray control through the bloodstream to the diseased part of the body for instance. Tumors, aneurysms, AVMs (arterio venous malformations) and stenoses are thus treated inter alia. The navigation of the catheter from the point of entry into the body to the site of the disease presents a huge challenge even for experienced medics. Navigation in the neural region is to be emphasized here since the targeted control in the filigran branched vascular system of the brain is highly demanding.

The problem here is that the catheter is indeed clearly visible during the fluoroscopy, but the anatomy of the patient, in particular their vascular structure, is in contrast hardly visible or possibly only visible after the injection of a contrast agent. The greatest problem with this procedure by the use for instance of the so-called "roadmap" and/or DSA functionality is that no spatial depth information is available, as can be inferred for instance from FIG. 2, which shows a classical "roadmap" image of a C-arc system according to FIG. 1, in which any depth information is absent. It is not obvious whether a vessel runs parallel to the observer, "going into the image" or "coming out of the image". "Roadmap" images are knowingly generated by subtracting so-called post-injection images, i.e. recordings using a contrast agent, so-called blank images, i.e. recordings without a contrast agent. They only show the veins filled with contrast agent, so that the doctor is able to orientate himself to them when the "roadmap" images are superimposed with fluoroscopy images.

Because the use in recent years of 3D image data records, as described for instance in the brochure "LEONARDO—Intelligent Postprocessing/Intelligent Investment./Reliable Planning./Efficient Usage.", by Siemens Medical Solutions, 2004, Order No.: A91100-M2040-B142-1-7600, became the prior art and are generally available, the aim is to use the 3D data record of the patient for navigation purposes. FIGS. 3 and 4 show a 3D volume of this type from two different views. The image in FIG. 4 is a lateral view from the right relative to the line of sight of the image according to FIG. 3. The marked areas point out particular sites to which reference is made in conjunction with the FIGS. 11 and 12.

With the aid of the classical "roadmap" functionality and a biplane C-arc system, for instance Siemens Artis dBA, described in the brochure "AXIOM Artis dBA/The soloist's duet for neuroradiology and universal angiography" by Siemens Medical Solutions, 2004, Order No. A91100-M1400-C824-1-7600, two Roadmap/DSA images which lie at an angle from one another are obtained simultaneously. The treating doctor is now able, on grounds of his experience, to extract spatial 3D information from these two images without depth information at least in the region in which he is currently interested. Finally, the possibilities of taking a three dimensional image of the vascular structure is however very limited.

With the aid of a 3D data record, the treating medic is now able to view the three-dimensional vascular structure, by allowing the 3D data record to be rotated on its 3D workstation and thus to be observed from different lines of sight (see FIGS. 3 and 4). But what he/she is lacking is the direct correspondence between the current x-ray image with the region of interest to him/her and the corresponding site in the 3D volume.

A method of this type, which reproduces these correspondences, is described for instance in the former patent application DE 10 2006 020 398.4.

A further alternative is one of superimposing the x-ray image with a corresponding projection of the 3D data record, as is shown for instance in FIG. 5. This is a quantum leap, but it only inadequately solves the problem of whether a vessel at a specific site runs parallel to the observer "going into the image" or "coming out of the image". It is also only visible with difficulty in FIG. 5 as to how a vessel runs in the depth, i.e. runs perpendicular to the observation plane. The reason for this observation is that as a human, it is only possible to detect the required depth information by rotating the 3D data record. And this degree of rotational freedom is not available when superimposing the x-ray image with a projection of the 3D data record. The projection of the 3D data record is firmly predetermined by the current position of the C-arc system, characterized by angulation, zoom, SID (Source-Image-Distance), table position, etc.

This argument clarifies that the possibility of being able to draw the necessary depth information from the observation of a fixed projection is necessary. To this end, approaches also exist which essentially amount to stereo vision:

It is possible to display special images on a 3D monitor. A stereo effect can thus also be achieved with a fixed projection. However this is neither sufficiently pronounced, nor do current 3D monitors fulfill the demands placed on the required resolution for instance.

It is possible to observe the projected images using special colored glasses (green/red) or polarization glasses, so-called anaglyph glasses. The glasses diverge however when used during surgery.

US 2003/0156747 A1 discloses a method for displaying projection or sectional images from 3D volume data of an examination volume, with which a gray scale value of a predeterminable projection or a predeterminable section composed of individual pixels is calculated from the 3D volume data. In this way, a displacement of a voxel of the examination volume displayed by the pixel is determined for each pixel of the gray scale value at a reference plane, a colored value corresponding to the displacement is assigned to each pixel of the gray scale value and a projection and/or sectional image is displayed by superimposing or coloring the gray scale value with the colored values assigned to each pixel so that a colored depth information is obtained.

SUMMARY OF THE INVENTION

The object of the invention is to design a method of the type mentioned in the introduction such that an examining person is able to draw the required depth information and alignments of individual vessels perpendicular to the observation direction from the observation of a fixed projection without further tools.

The object is achieved in accordance with the invention such that changes to the 3D structures in the direction of the surface standards of the 2D projection are characterized by changes to the properties of the illustrated 3D structures. By way of example, the color-based display of 3D structures in 2D projection images over surface standards allows the practiced observer to identify how the structure runs perpendicular to the observation direction.

In accordance with the invention, the properties to be modified of the 3D structures can be changes in patterns, colors and/or shadings of the 3D structures.

The method can advantageously comprise the following steps:
a) Implementing a surface segmentation of the 3D data record to determine the required surface standards for each surface point
b) Calculating the angle of each surface standard against the horizontal of a plane, which is perpendicular to the image plane,
c) Use of the calculated angles, which always lie in the range of −90° to 90°, for marking the associated surface points and
d) Repeating the steps b) and c) with each change to the projection of the 3D data record.

It has proven advantageous for the image plane according to step b) to be selected such that it also lies perpendicular to the x-axis of the projection image.

As the resulting angle is dependent on the projection, so that this angle herewith modifies with a rotation of the 3D data record, it has proven expedient if after a rotation of the 3D data record, the angle is recalculated. Besides rotating, other translations also exist as possible triggers for the recalculation of the angle.

The reason for this is that the projection of the 3D data record has to be carried out perspectively, since the production process of an x-ray image on the C-arc system is also a perspective projection.

The method according to the invention can be advantageously used in the neural region if the 3D structures are vascular structures in medical 3D data records.

BRIEF DESCRIPTION OF THE DRAWINGS

The invention is described in more detail below with reference to the exemplary embodiments illustrated in the drawings, in which.

DETAILED DESCRIPTION OF THE INVENTION

In the present patent application, a solution concerning how to enrich a fixed projection with the necessary depth information is proposed, without having to use special hardware, such as 3D monitors or stereo glasses.

Figure 1:
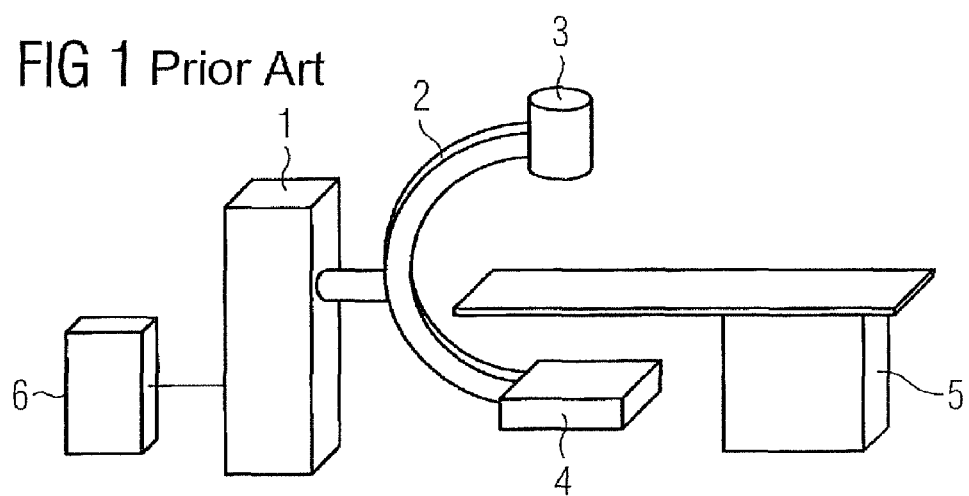
FIG. 1 shows a known x-ray diagnostics facility with a C-arc.
Figure 2:
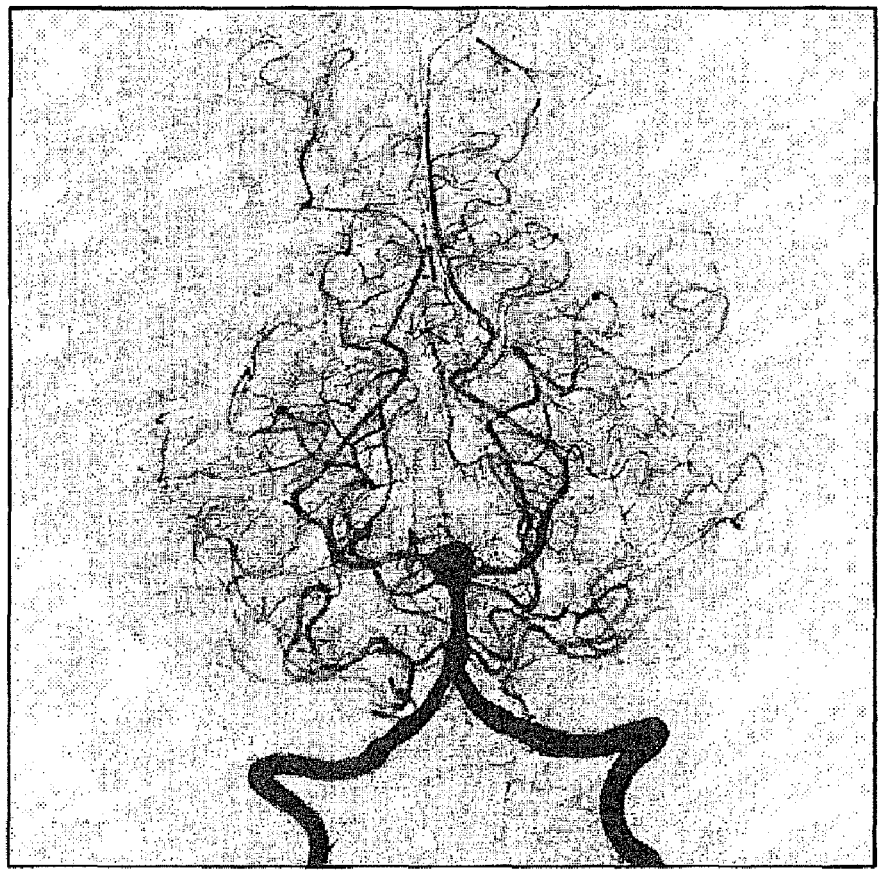
FIG. 2 shows a Roadmap image of a C-arc system according to FIG. 1.
Figure 3:
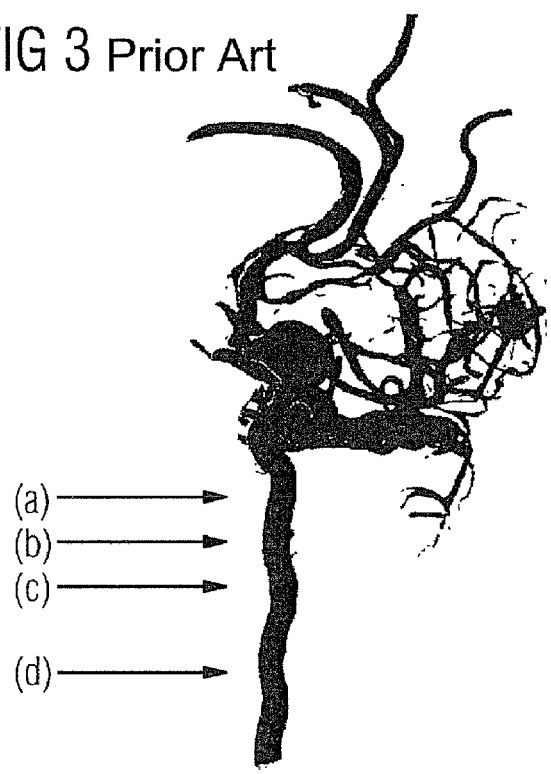
FIG. 3 shows a 3D volume from a first view.
Figure 4:
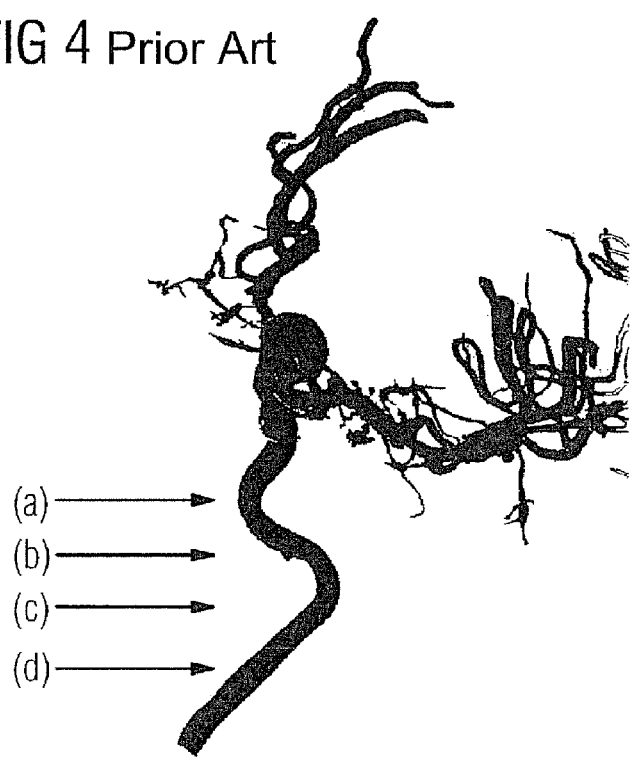
FIG. 4 shows a 3D volume from a second view, laterally from the right to the first view according to FIG. 3.

If the problem of orientating a vessel in a special or any other arbitrary surface is generally examined more closely, it is possible to identify that the direction of a vessel and/or surface point is determined at each arbitrary point by two degrees of freedom ("directions") (cf. arrows in FIGS. 3 and 4):

A degree of freedom is the direction of the vessel to the left and/or right. This is clearly visible from the images and does not require any special visualization. This degree of freedom is directly visible in the image.

The second degree of freedom is the direction of the vessel in the depth. This direction specifies whether a vessel runs parallel to the observer, "going into the image" or "coming out of the image". This is barely visible from the images despite complicated computer graphics using illumination effects. This is also constantly confirmed by neuroradiologists. In the example in FIG. 3, it is not possible to determine for the vessel parts marked with the arrows from this projection whether the vessel runs parallel to the observer "going into the image" or "coming out of the image". In the projection according to FIG. 4, this would naturally be possible, but this projection may not be applied by the doctor for other reasons as mentioned above for instance.

The required and hitherto absent depth information can then be obtained if a possibility is found of visualizing each point of the surface such that the direction of its surface standards, i.e. the vector, which lies perpendicular on this surface point and thus specifies the "direction" of this point, is clearly visible. This principle is clarified on the basis of FIG. 6:

A 3D data record 10 is observed with an individual rod-like vessel 11.

A projection 12 is finally viewed with an image 13 of the vessel 11, from which depth information is no longer visible.

With this image, almost all possible locations of the vessel are conceivable:

A vessel 16 which runs parallel to an image plane 14 as viewed by an observer 15, A vessel 17 coming out of the image plane 14 at an angle α of +30° for instance and A vessel 18 going into the image plane at an angle α of −60° for instance.

To be able to detect the direction of the vessel, a possibility must now be found of visualizing the illustrated angle α.

For this visualization, a colored illustration of each individual point of the 3D volume data record can be used as a function of its standards relative to the observer. This means that each of the possible clear angles of −90° to 90° is assigned a unique color, e.g. 0°=yellow, 30°=green, −30°=red etc. with all possible intermediate color tones. This association of angles to colors is illustrated by way of example in FIG. 7. The colored pattern results here from a change in the colored tone angle in the HSV colored room for instance.

Figure 7:
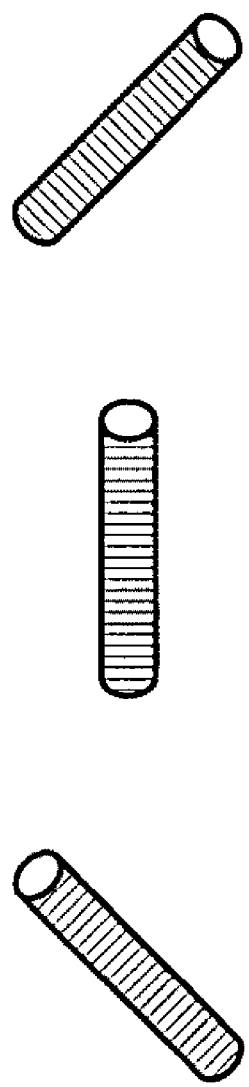
FIG. 7 shows an assignment of angles to colors and shadings.

In place of the color assignment, which is not visible for instance on a monochrome monitor, the 3D structure can also be marked by shadings or patterns, as can also be seen in FIG. 7. Here the angle of the shading can characterize the angle α. A horizontal shading means an angle α of 0°, a shading increasing to the right signifies an angle α of <0° and a shading increasing to the left signifies an angle α of >0°.

Figure 6:
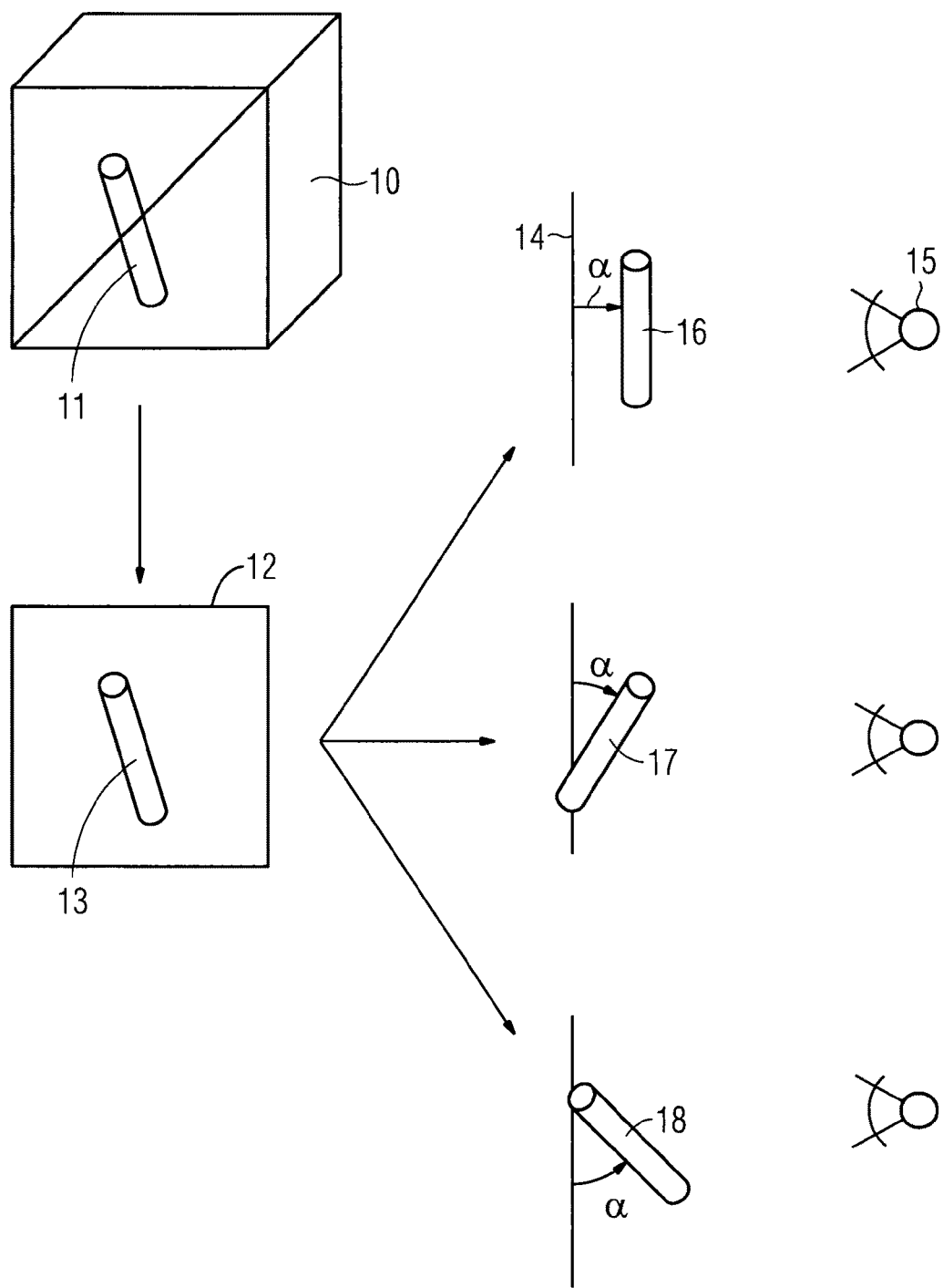
FIG. 6 shows an illustration of the problems such that the depth direction information of a vessel gets lost in a 3D data record during the projection.
Figure 8:
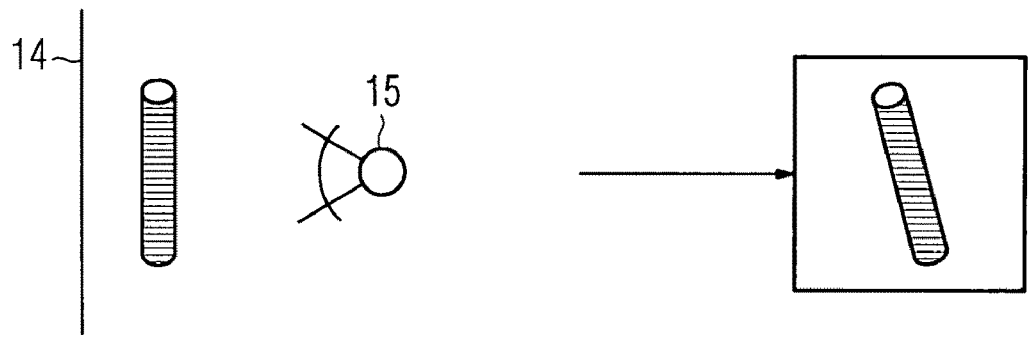
FIG. 8 shows an inventive illustration of a vessel parallel to the projection plane.
Figure 9:
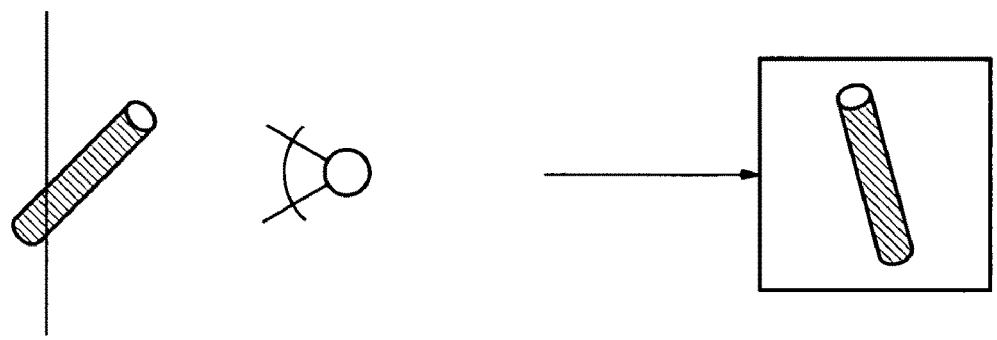
FIG. 9 shows an inventive illustration of a vessel coming from the projection plane.
Figure 10:
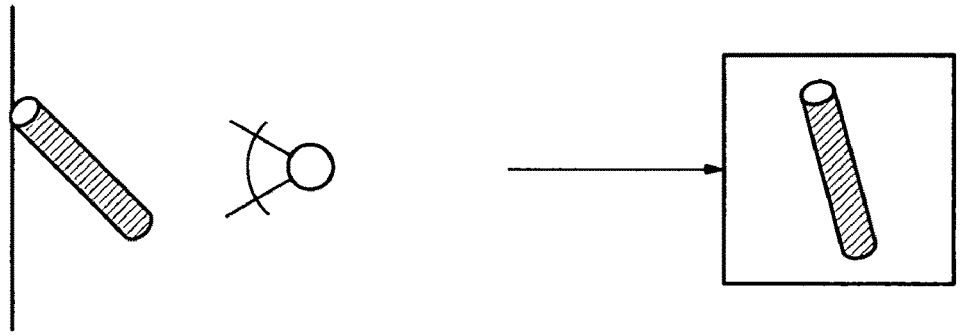
FIG. 10 shows an inventive illustration of a vessel going into the projection plane.

If this assignment is now applied to the example in FIG. 6, the illustration of the vessel encoded by the shading results in the FIGS. 8 and 10. The direction of the vessel in the depth is now characterized here with the aid of the shading.

Figure 11:
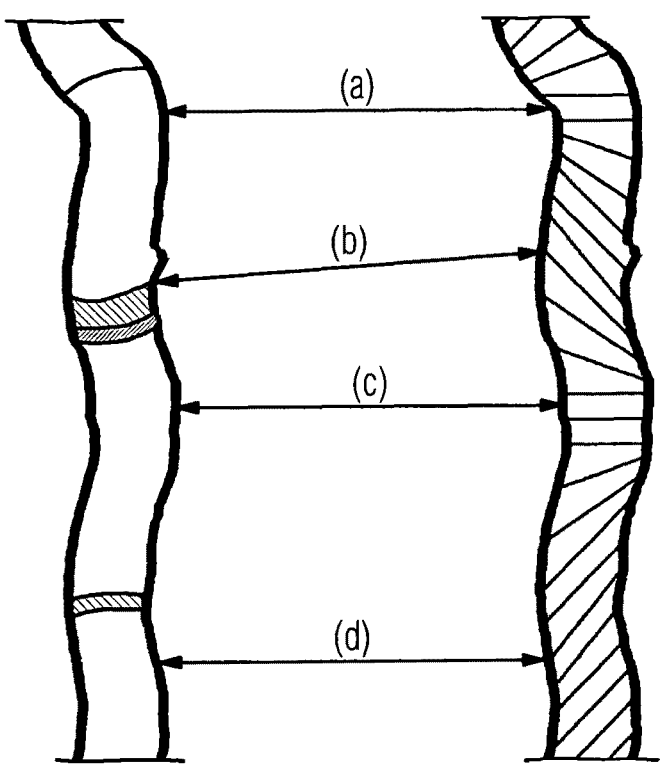
FIG. 11 shows illustrations of the marked section of the 3D data record according to FIG. 3 for comparing the volume rendering and the method according to the invention and
FIG. 12 shows illustrations of the marked section of the 3D data record according to FIG. 11 with color details for highlighting a variation in the method according to the invention.

According to these introductory explanations, the question is now posed as to how this procedure operates with real data records. FIG. 11 shows the same view of the 3D data record with the marked positions according to FIG. 3, with the lower section from FIG. 3 being displayed in FIG. 11 both according to the current volume rendering method (left) and also according to the inventive method (right). For improved understanding, the points (a) to (d) marked in FIG. 3 and the meaning of the respective local depth direction/shading and an inventive possible coloring (see also FIG. 12) are to be explained. It represents:

(a) an inflection point from "going into the image plane" with an increased shading (red, above) via "going into the image plane" with horizontal shading (yellow) to "coming from the image plane" with reducing shading (green, below), (b) a region, which moves significantly "out of the image plane" with reducing shading (blue, i.e. approx. 60°), (c) an inflection point parallel to the observer with horizontal shading in the transition from the increasing shading to reducing shading (yellow in transition from green to red) and (d) a region, which moves significantly "into the image plane" with a significantly increasing shading (red to violet).

Figure 12:
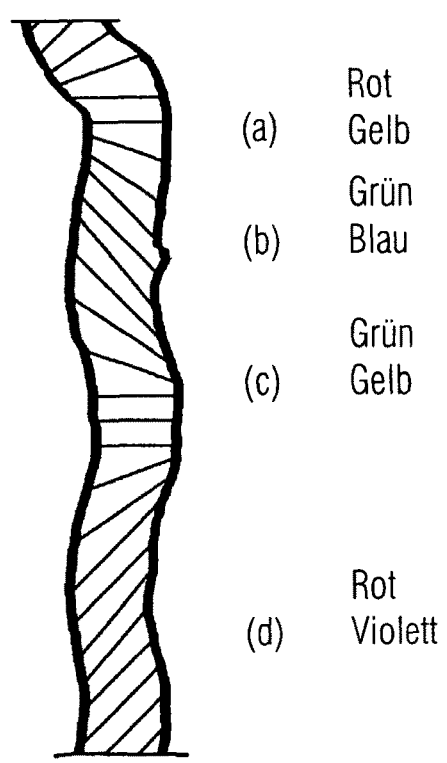

The shadings and colors in FIGS. 11 and 12 are naturally only applicable to precisely this one view. If the 3D data record is rotated, the features of the structures, the shadings or colors naturally also change accordingly; after all the depth direction of the vessel also changes.

According to the procedure, the method according to the invention is composed of the following steps:

1) Implement a surface segmentation of the 3D data record. To this end, the Marching-Cubes algorithm, as described by William E. Lorensen and Harvey E. Cline in "Marching Cubes: A High Resolution 3D Surface Construction Algorithm", Maureen C. Stone (eds), Computer Graphics (SIGGRAPH '87 Proceedings), 1987, is suitable for instance or the approach according to U. Labsik, K. Hormann, M. Meister, G. Greiner "Hierarchical Iso-Surface Extraction" Journal of Computing and Information Science in Engineering, December 2002, Volume 2, Issue 4, pages 323 to 329. This process provides the required surface standards for each surface point.

2) Calculate the angle of each surface standard against the horizontal of a plane, which lies at right angles to the image plane. This plane can be selected for instance such that it also lies at right angles to the x-axis (right-left) of the projection image. The resulting angle is dependent on the projection, and this angle herewith changes with a rotation of the 3D data record.

3) Use the calculated angles, which always lie in a range of −90° to 90°, in order to color the associated surface points until all visible points are illustrated in color. The same also applies to the shading.

4) The points 2) and 3) are implemented with each change in the projection of the 3D data record.

Figure 5:
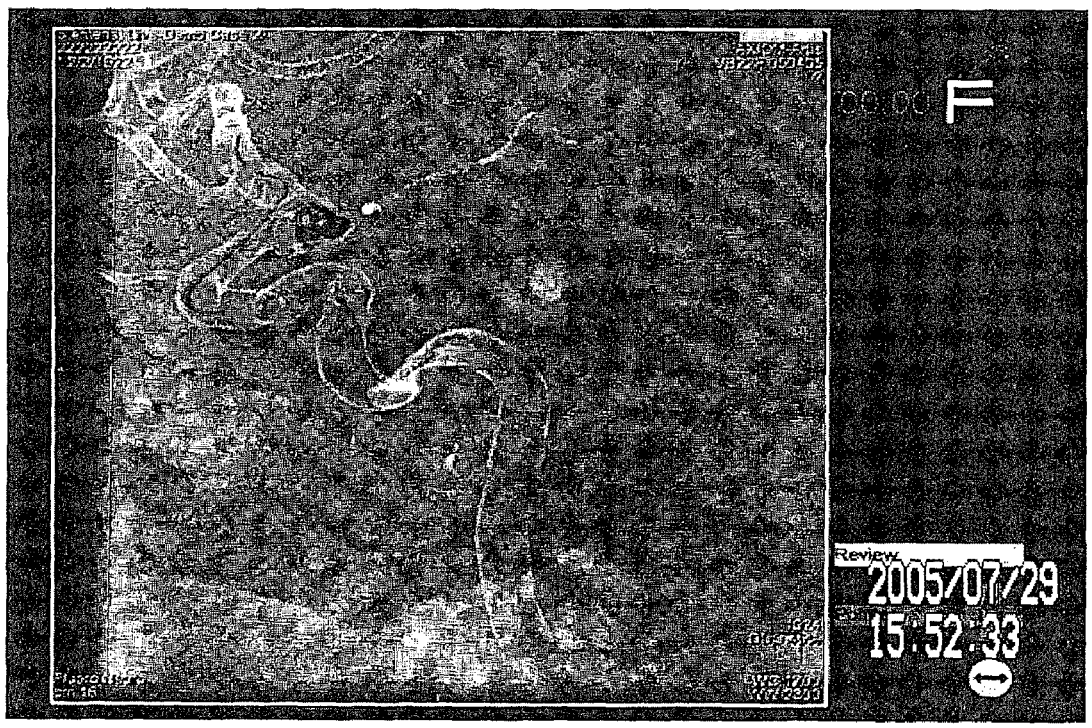
FIG. 5 shows a superimposition of an x-ray image and a projected 3D data record, in which the influence of spatial depths, which can be achieved, is not very pronounced.

This method according to the invention enables direction information in volume data records to be modeled by way of colors or shadings. This offers a plurality of advantages:

If a marked volume image of this type superimposes a real x-ray image, the doctor obtains completely new possibilities for catheter navigation. This can herewith be deduced by replacing the superimposition of the black/white 3D data record in FIG. 5 with the colored variant according to the invention. For the first time, the doctor is thus able to identify, from an individual projection, precisely in which direction he/she needs to control his/her catheter in respect of the depth direction. If the projection of the 3D volume data record is continuously adjusted to that of the C-arc system, the doctor continually receives the depth information which fits with his/her current x-ray image. By superimposing the colored 3D data record, he/she thus obtains the depth information missing in the x-ray image for the vessel of interest to him/her.

This approach is thus for the first time able to fulfill the long-term wish of many doctors of navigating in the complex vascular system of the brain without obligating the use of a biplane system. This speeds up operations and thus not only means a reduced x-ray dose for the patient but also generally a more pleasant operation.

The focus of this present patent application lies in the use in the neural region with the use of 3D angio data records. Further fields of application are however also conceivable, which benefit from the ability to display a number of surface structures in projection images.

The invention claimed is:

1. A method for displaying a 3D structure of an object in a 2D projection image of the object, comprising:
providing a 3D data record of the object by an x-ray diagnostic unit;
implementing a surface segmentation of the 3D data record for determining a surface standard for a surface point of the 2D projection image by a computing device;
calculating an angle of the surface standard against a plane that is perpendicular to an image plane by the computing device;

marking the surface point based on the calculated angle that is in a range of −90° to 90° by the computing device; and illustrating a depth of the 3D structure in a direction of a surface standard of the 2D projection image by a property of the illustrated 3D structure using the marked surface point by a display device, wherein the depth of the 3D structure is illustrated in the direction of the surface standard of the 2D projection image from coming out of the image plane at a positive angle to going into the image plane at a negative angle and being parallel to the image plane at a zero angle.

2. The method as claimed in claim 1, wherein the 3D structure is presented as individual volumetric gray scale values as a result of volumetric scans using a plurality of sectional planes of a medical tomography of the object.

3. The method as claimed in claim 1, wherein the depth of the 3D structure is illustrated by the property of the 3D structure selected from the group consisting of: a pattern of the 3D structure, a color of the 3D structure, and a shading of the 3D structure.

4. The method as claimed in claim 1, wherein the steps of calculating and marking are repeated for a further 2D projection image of the 3D data record.

5. The method as claimed in claim 1, wherein the image plane is perpendicular to an X axis of the 2D projection image.

6. The method as claimed in claim 1, wherein the angle is recalculated after a rotation of the 3D data record and the surface point is remarked based on the recalculated angle for a further 2D projection image of the 3D data record.

7. The method as claimed in claim 1, wherein the 3D structure is a vascular structure of the object in the 3D data record.

8. The method as claimed in claim 1, wherein the depth of the 3D structure is illustrated in an observation direction of the 2D projection image.

9. The method as claimed in claim 1, wherein a unique color is assigned to the angle in the range of −90° to 90°.

10. The method as claimed in claim 1, wherein a unique shading is assigned to the angle in the range of −90° to 90°.

11. A medical device for displaying a 3D structure of an object in a 2D projection image of the object, comprising:
a computing device that:
implements a surface segmentation of a 3D data record of the object for determining a surface standard for a surface point of the 2D projection image,
calculates an angle of the surface standard against a plane that is perpendicular to an image plane,
marks the surface point based on the calculated angle that is in a range of −90° to 90°; and
a display device that illustrates a depth of the 3D structure in a direction of the surface standard by a property of the illustrated 3D structure using the marked surface point,
wherein the depth of the 3D structure is illustrated in the direction of the surface standard of the 2D projection image from coming out of the image plane at a positive angle to going into the image plane at a negative angle and being parallel to the image plane at a zero angle.

12. The device as claimed in claim 11, wherein the 3D structure is presented as individual volumetric gray scale values as a result of volumetric scans using a plurality of sectional planes of a medical tomography of the object.

13. The device as claimed in claim 11, wherein the depth of the 3D structure is illustrated by the property of the 3D structure selected from the group consisting of: a pattern of the 3D structure, a color of the 3D structure, and a shading of the 3D structure.

14. The device as claimed in claim 11, wherein the angle is recalculated after a rotation of the 3D data record and the surface point is remarked based on the recalculated angle for a further 2D projection image of the 3D data record.

15. The device as claimed in claim 11, wherein the image plane is perpendicular to an X axis of the 2D projection image.

16. The device as claimed in claim 11, wherein the 3D structure is a vascular structure of the object in the 3D data record.

* * * * *